US007653702B2

(12) United States Patent
Miner (10) Patent No.: US 7,653,702 B2
(45) Date of Patent: Jan. 26, 2010

(54) METHOD FOR AUTOMATICALLY ASSOCIATING CONTEXTUAL INPUT DATA WITH AVAILABLE MULTIMEDIA RESOURCES

(75) Inventor: Cameron Shea Miner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 11/234,638

(22) Filed: Sep. 23, 2005

(65) Prior Publication Data

US 2006/0031486 A1      Feb. 9, 2006

Related U.S. Application Data

(62) Division of application No. 09/515,699, filed on Feb. 29, 2000, now abandoned.

(51) Int. Cl.
*G06F 15/16* (2006.01)
(52) U.S. Cl. .................. 709/217; 709/201; 707/3; 707/4; 707/5; 707/6
(58) Field of Classification Search ......... 709/217–219, 709/223–224, 200; 707/2–6
See application file for complete search history.

(56) References Cited

U.S. PATENT DOCUMENTS 5,911,139 A      6/1999   Jain et al.
6,564,206 B1 *   5/2003   Ikeda ............................ 707/3

FOREIGN PATENT DOCUMENTS

WO      9967698 A2    12/1999

* cited by examiner

*Primary Examiner*—Saleh Najjar
*Assistant Examiner*—Faruk Hamza
(74) *Attorney, Agent, or Firm*—Cantor Colburn LLP; Leonard Guzman (57) ABSTRACT

A method for automatically associating contextual input data with available multimedia resources includes capturing the contextual input data and processing the contextual input data and formulating a query based on processed contextual input data. The processed contextual input data is associated with the multimedia resources to generate association matches.

8 Claims, 8 Drawing Sheets

METHOD FOR AUTOMATICALLY ASSOCIATING CONTEXTUAL INPUT DATA WITH AVAILABLE MULTIMEDIA RESOURCES

PRIORITY CLAIM

The present application is a divisional application of, and claims the priority of, U.S. patent application Ser. No. 09/515,699, filed on Feb. 29, 2000 now abandoned, which is assigned to the same assignee as the present application, and which is incorporated herein by reference.

FIELD OF THE INVENTION

The present invention relates to the field of data processing, and particularly to a software system and associated method for accessing, transducing, enhancing, searching, or otherwise processing various contextual data acquired from objects. More specifically, this invention relates to a system and method for automatically associating acquired data and contextual information with available multimedia resources and presenting the results to the user.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

Typically, each search result rendered by the search engine includes a list of individual entries that have been identified by the search engine as satisfying the user's search expression. Each entry or "hit" includes a hyperlink that points to a Uniform Resource Locator (URL) location or web page. In addition to the hyperlink, certain search result pages include a short summary or abstract that describes the content of the web page.

A common technique for accessing textual materials on the Internet is by means of a "keyword" combination, generally with Boolean operators between the words or terms, where the user enters a query comprised of an alphanumeric search expression or keywords. In response to the query, the search engine sifts through available web sites to match the words of the search query to words in a metadata repository, in order to locate the requested information.

This word match based search engine parses the metadata repository to locate a match by comparing the words of the query to indexed words of documents in the repository. If there is a word match between the query and words of one or more documents, the search engine identifies those documents and returns the search results in the form of HTML pages.

This type of search engine is thus very sensitive to the words selected for the query. The terminology used in a query reflects each individual user's view of the topic for which information is sought. In other terms, the content of the query and the resulting response from word based search engine, is highly dependent upon individual users' expression of the query terms, and different users may obtain different search results when searching for the same or similar information. For example, to locate information about medical services, a first user may compose the query "doctors and services", and a second user may compose the query "hospital and medical and research".

Furthermore, not only is the quantity of the WWW material increasing, but the types of digitized material are also increasing. For example, it is possible to store alphanumeric texts, data, audio recordings, pictures, photographs, drawings, images, video and prints as various types of digitized data. However, such large quantities of materials is of little value unless it the desired information is readily retrievable. While certain techniques have been developed for accessing specific types of textual materials, these techniques are at best moderately adequate for accessing graphic, audio or other specialized materials. Consequently, there are large bodies of published materials that still remain inaccessible and thus unusable or significantly underutilized.

Attempts have been made to construct a search and retrieval system that is not highly dependent upon the exact words chosen for the query, and that generates a similar response for different queries that have similar meanings. An exemplary attempt is illustrated in U.S. Pat. No. 5,953,718 to Wical, titled "Research Mode for a Knowledge Base Search and Retrieval System".

The Wical patent describes a search and retrieval system that generates a research document which infers an answer to a query from multiple documents. The search and retrieval system includes point of view gists for documents to provide a synopsis for a corresponding document with a slant toward a topic. To generate a research document, the search and retrieval system processes a query to identify one or more topics related to the query, selects document themes relevant to the query, and then selects the point of view gists, based on the document themes, that have a slant towards the topics related to the query. A knowledge base, which includes categories arranged hierarchically, is configured as a directed graph to links those categories having a lexical, semantic or usage association. Through use of the knowledge base, an expanded set of query terms are generated, and research documents are compiled that include the point of view gists relevant to the expanded set of query terms. A content processing system identifies the themes for a document, and classifies the document themes in categories of the knowledge base.

However, this search and retrieval system and similar other conventional systems rely on the user entering alphanumeric keyword queries, and are thus still prone to rendering ineffective and inaccurate results that might not fully satisfy the user's need. For example, if a user is searching for a leather purse with a specific design, and a peculiar color she is incapable to express in terms of an alphanumeric query, the user will endure the aggravation of successive compound searches to locate the desired purse. Even then, the user desiring to obtain a comparative price report will face a tedious task collecting the desired information.

Attempts have been proposed to facilitate purchases over the Internet. One such attempt is described in U.S. Pat. No. 6,016,504 to Arnold et al., titled "Method and System for Tracking the Purchase of a Product and Services over the Internet".

The Arnold et al. patent describes a method for establishing and maintaining a virtual outlet ("VO") relationship on the Internet between an entity that controls and manages a web site constituting a VO and a merchant that controls and manages a different web site. The VO presents a series of VO web pages to customers that contain descriptive information about products from one or more merchants. Customers can link through the VO web pages directly to a merchant web page provided to the customer computer by the merchant computer for the purpose of obtaining more detailed information about the product and for ordering the product. When the customer has finished ordering a product, the customer computer returns to a VO web page. To the customer, it appears that the entire ordering process is conducted entirely within the VO web pages. The merchant then credits the VO for the sale of the product to the customer, charges the purchase to the customer, and sends the ordered product to the customer.

However, these attempted solutions still rely on conventional keyword searching with limited input from the users. Further, these solutions do not allow for the automatic formulation of queries to improve the users' search capability. There is therefore a still unsatisfied need for a system and method that address the concerns with conventional search and marketing strategies, and that significantly increase the users' input choices and improve the search efficiency.

SUMMARY OF THE INVENTION

The system and method for automatically associating acquired contextual data with available multimedia resources of the present invention satisfy the foregoing need. In accordance with one embodiment, the present method includes capturing the contextual input data and processing the contextual input data and formulating a query based on processed contextual input data. The processed contextual input data is associated with the multimedia resources to generate association matches.

As used herein, "contextual" means or implies the surrounding circumstances in which an object exists or an event occurs. For example, the contextual content of a photograph can be all the information surrounding the situation in which the photograph is taken, including special and physical parameters such as time, location, elevation, etc., as well as information gathered by various sensors such as temperature, pressure, humidity, light level, sound, and acceleration sensors, and user interface elements such as buttons, switches, etc. The contextual data helps to understand the context of the acquired data.

The system includes a contextual multimedia association module which is installed on a server, a personal assistant device, and a contextual input device. In use, the contextual multimedia association module accesses the Internet and downloads web documents to a metadata repository, where the downloaded documents are stored and updated systematically. The user captures input data about an object or item of interest by means of the contextual input device, and transmits the captured data to the personal assistant device. The personal assistant device automatically digitizes and processes the input data, and further automatically formulates a query, creates or updates a digital user profile, and transmits the query to the contextual multimedia association module. The contextual multimedia association applies the query to numerous data stores, optimizes the search results, and then presents the optimized search results to the user.

The system and method of the present invention is capable of providing various features, including but not limited to the following:

Image magnification with anti-jitter or jitter reduction feature.

Image search capability, whereby the system automatically formulates a query, searches for, and matches the image content of an object to images in various data stores. This image search capability allows the system and method to be used in various commercial applications such as:

Information access based on data acquired from real objects.

The association of on-line "virtual" information with physical "real" objects.

E-commerce: The system enables on-line shopping in-situ based on imaged items.

Remote medical and treatment: For example, a dermatologist can image a skin rash, and the system compares a skin legion to known diseases and acquires additional information from various online medical databases.

Security, personal information, electronic validation of information to create a "digital witness", digital notary public, digital signature capture, insurance: For example, facial recognition of a customer can be taken at the time of sale. As another example, a signature can be captured or insurance photos taken and authenticated by time and location. As another example, the system can validate images and their authenticity.

Advanced information access in museums: For example, images of art works can be acquired by a curator, and the system will recognize these works and present relevant details.

Automotive diagnostic: For example, a mechanic can image a car vehicle identification number (VIN) and take a picture of the part of interest. The system will match the images and display relevant pages from shop manuals.

Triage: For example, damages and/or injuries can be taken at an accident site, and the system can perform an automatic search and sorting (e.g. triage) of patients, suggest courses of action, and request authorization for settlement, repair, indemnification, medical care, and so forth.

Expanded optical character recognition (EOCR) of text acquired from real objects, such as books, road signs, shopping, and so forth, with automatic Internet search capability.

Education, training and translation; for example, students can input a query, or the system can automatically formulate a query from an imaged object of interest, and the system will OCR the relevant text, perform translation if needed, and undertake an in-depth search of data stores around the world, even if the information is stored in different languages. The search results are translated to the language of interest and presented to the student. This feature can also be used for in-store shopping. For example, when shopping for books, book titles could be scanned, and related books will be displayed.

Audio to text search capability, whereby sounds, such as animal sounds, are captured and compared to sounds in various data stores to identify the animal specie or other requested information about the source of the audio signal.

Spatial and temporal recordation of events, wherein for example, a user can combine visual information with virtual or invisible information such as GPS. In one application, the system allows the user to spatially record sound, and whenever the user reaches a destination location the system reminds the user by playing the recorded message.

Real-time solution of mathematical or geometric problems, real time problem solving. For example, this feature can be used to balance check books, to convert currencies, and in a variety of similar other applications. In another specific example, the system can assist the user in solving geometric problems using the imaged information and present solutions to the user. Practical applications involve home repair and replacing parts when dimensions are not known.

Mass spectrometry: For example, a user can acquire chemical and other data about a material, and the system will automatically formulate and apply a search for identifying the material.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

Figure 1:
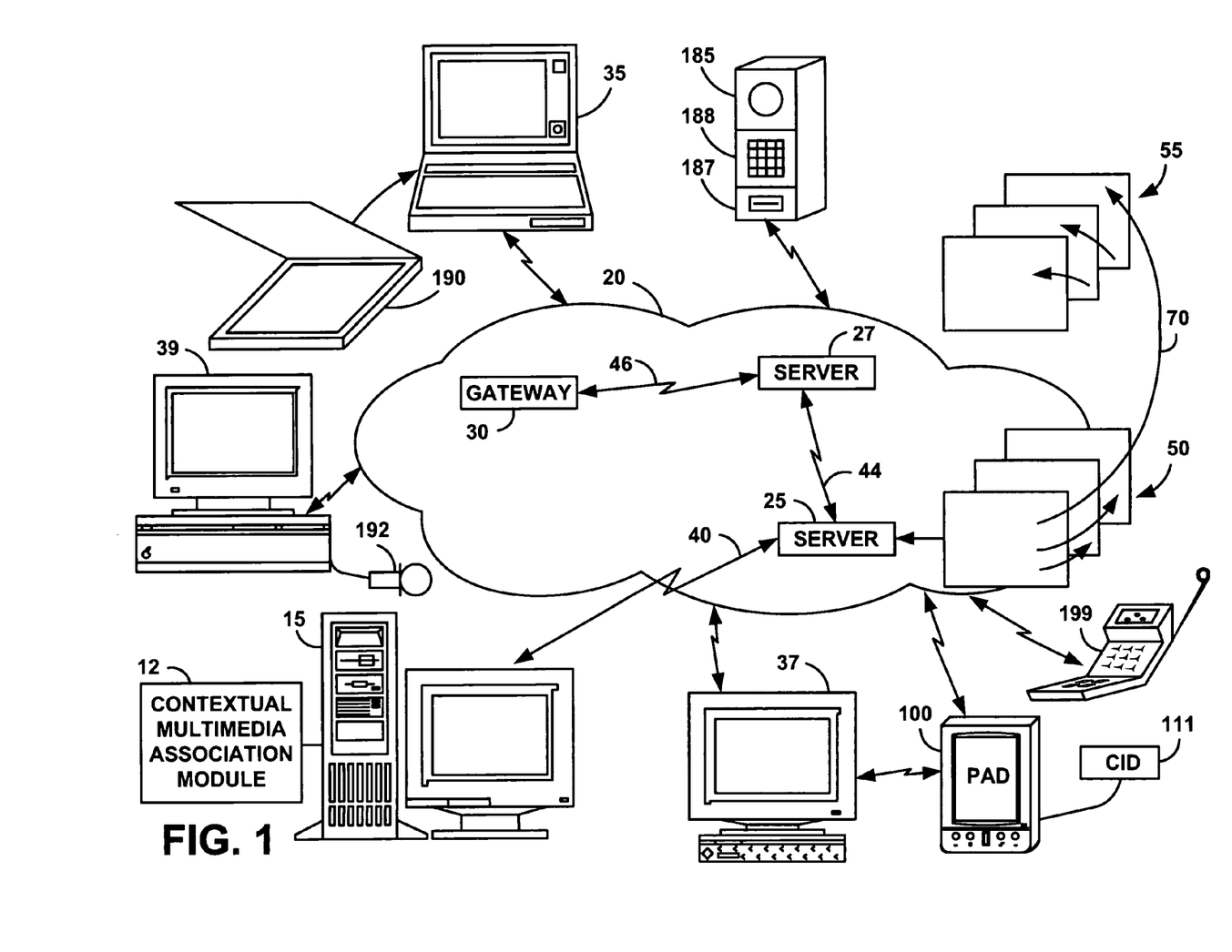
FIG. 1 is a schematic illustration of an exemplary operating environment in which a system for automatically associating the acquired contextual data with available multimedia resources may be used.

FIG. 1 portrays the overall environment in which a system 10 for automatically processing acquired contextual data with available multimedia resources may be used in accordance with the present invention. Although an exemplary preferred embodiment of the system 10 will be described herein in connection with the WWW, it should be clear that the system 10 can be used with a stand-alone database of terms that may have been derived from the WWW and/or other sources.

Figure 2:
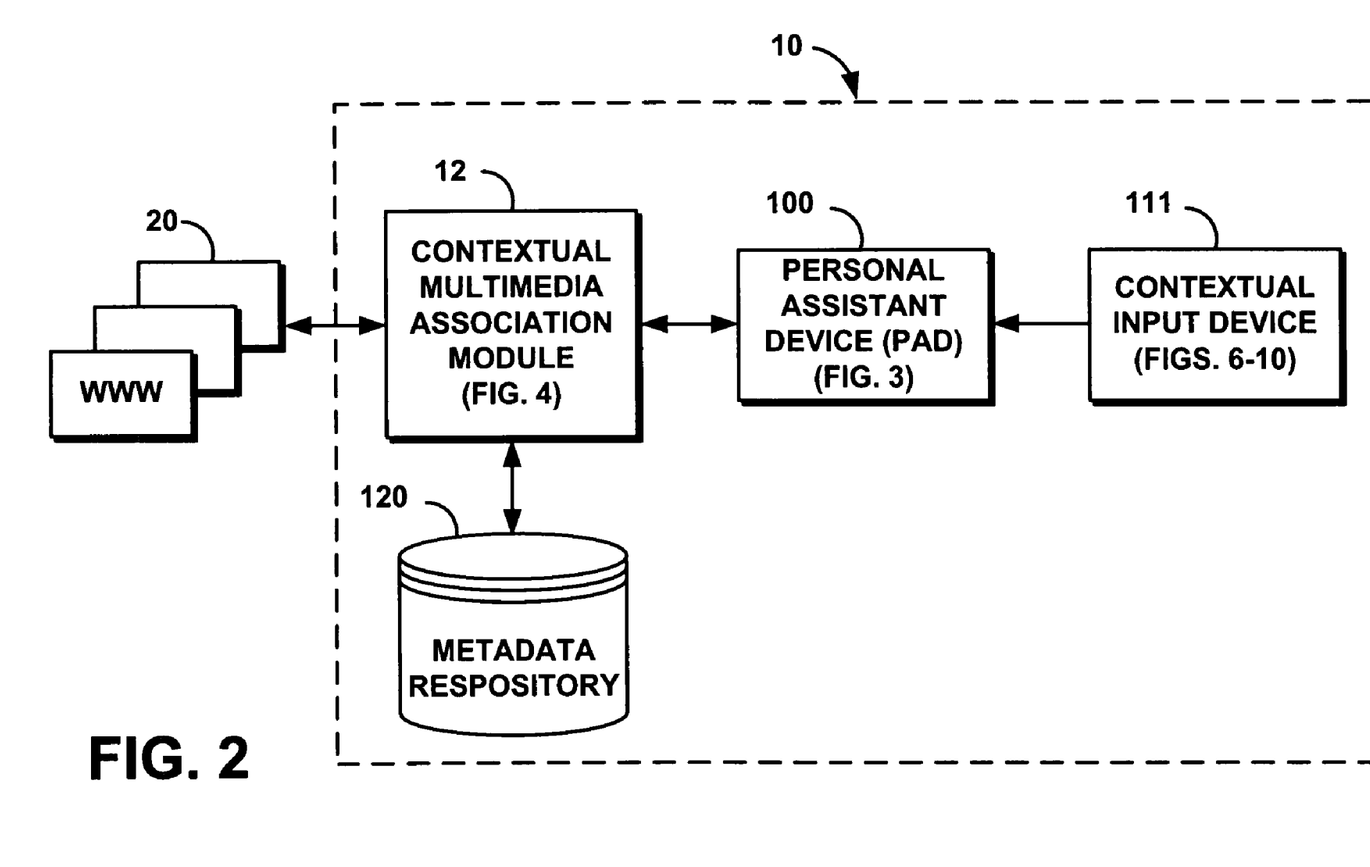
FIG. 2 is a high level block diagram of the system of FIG. 1, illustrating the main constituent components or modules of the system.

As further illustrated in FIG. 2, the system 10 includes a contextual multimedia association module 12 comprised of a software or computer program product. The contextual multimedia association module 12 is typically embedded within, or installed on a host server 15. Alternatively, the contextual multimedia association module 12 can be saved on a suitable storage medium such as a diskette, a CD, a hard drive, or like devices.

The WWW is represented as a cloud-like communication network 20 (FIG. 1) and is comprised of communication lines and switches connecting servers such as servers 25, 27, to gateways such as gateway 30. The servers 25, 27 and the gateway 30 provide the communication access to the WWW Internet. Users, such as remote Internet users can query the host server 15 for the desired information. For illustration purposes only, and without intent to limit the scope of the invention, the users are represented by a variety of computers such as computers 35, 37, 39, and a variety of other interface devices and appliances that will be described later in more detail.

The host server 15 is connected to the network 20 via a communications link such as a telephone, cable, satellite link, or cellular radio network 40. The servers 25, 27 can be connected via high speed Internet network lines 44, 46 to other computers and gateways. The servers 25, 27 provide access to stored information such as hypertext or web documents indicated generally at 50, 55. The hypertext documents 50, 55 most likely include embedded hypertext links to other locally stored pages, and hypertext links 70 to other webs sites or documents 55 that are stored by various repositories or web servers such as the server 27.

FIG. 2 depicts an exemplary system 10 as being connected to the network (or WWW) 20. The system 10 is generally comprised of the server 15 with the contextual multimedia association module 12 installed therein, a personal assistant device (PAD) 100, and a contextual input device (CID) 111.

In operation, and as it will be explained later in much greater detail, the contextual multimedia association module 12 accesses the network 20 via the server 15, and downloads web documents to a metadata repository 120. The metadata repository 120 forms part of the server 15, where the downloaded web documents are stored and updated systematically. The user captures information from (or about) an object, or senses an environmental condition (including geographical, temporal or other conditions) by means of the contextual input device 111, and transmits the captured data to the personal assistant device 100.

The personal assistant device 100 automatically digitizes and processes the captured data, and further automatically formulates a preliminary query, and transmits this preliminary query to the contextual multimedia association module 12. In one embodiment, the contextual multimedia association module 12 automatically searches the metadata repository 120 and determines if the preliminary query needs to be refined further, in order to improve the search results. If the contextual multimedia association module 12 determines that the preliminary query could be improved, it returns a request for additional information to the personal assistant device 100.

If the user provides the requested information via the personal assistant device 100, the contextual multimedia association module 12 automatically formulates a first formal query. Optionally, the contextual multimedia association module 12 applies this first formal query to the metadata repository 120 and determines if additional information is needed to render an optimal search. If so, the contextual multimedia association module 12 sends another request for information to the personal assistant device 100.

As described previously, if the user provides the requested information, the contextual multimedia association module 12 can search the metadata repository 120 to refine the search query. If the search query is satisfactory, the contextual multimedia association module 12 presents the search results (or association matches) to the personal assistant device 100, or alternatively, the contextual multimedia association module 12 can apply the latest query and/or the latest query result or results to the network 20, to further update the search result or to conduct a new broader search.

Figure 9:
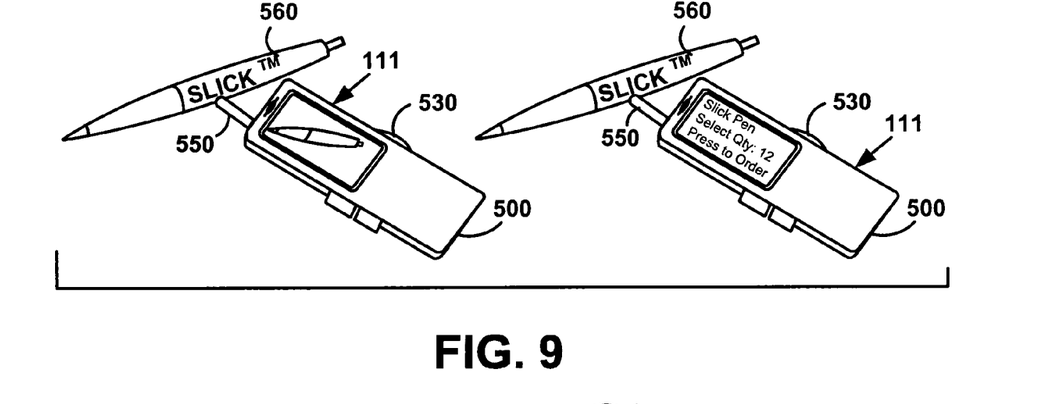
FIG. 9 is a sequence of schematic diagrams of the contextual input device of FIG. 5, illustrating the process acquiring data from a pen and processing the input data by the system of FIG. 2, to perform an electronic commerce (e-commerce) transaction.
Figure 10:
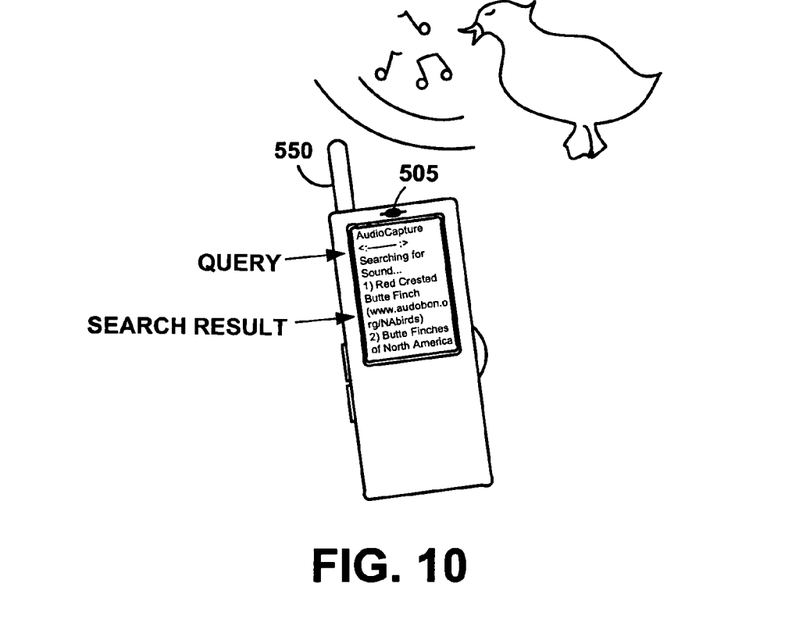
FIG. 10 is a schematic diagram of the contextual input device of FIG. 5, shown acquiring audio signals from a bird, to illustrate an audio search capability of the system of FIG. 2.
Figure 11:
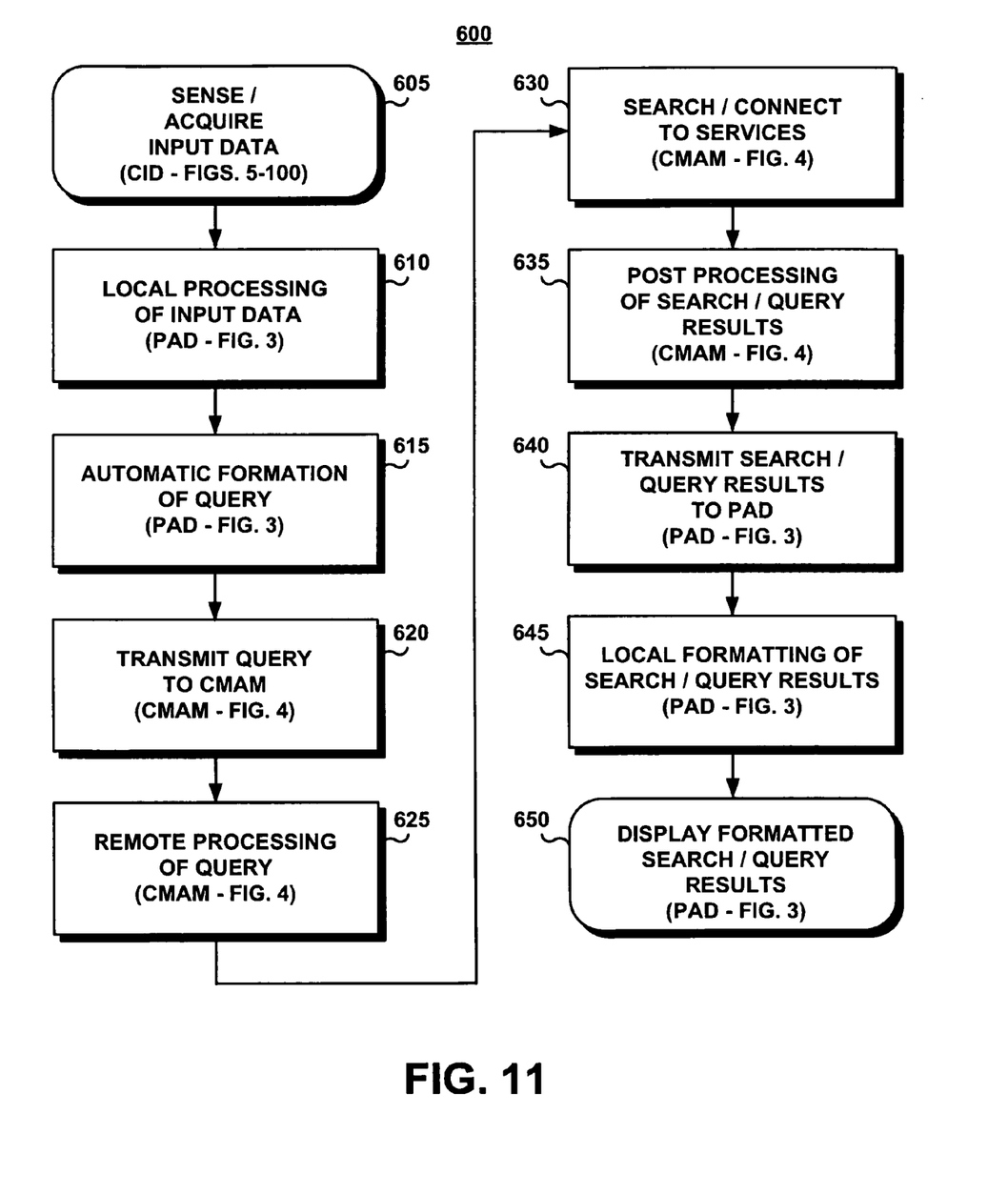
FIG. 11 depicts a functional flow chart that illustrates an exemplary method of use and operation of the system of FIG. 2.

Having described the main constituent components and the operation of the system 10, a detailed description of these components will be provided in connection with FIGS. 1 through 11, and a detailed description of the operation or mode of use of the system 10 will be provided in connection with FIG. 11.

Figure 3:
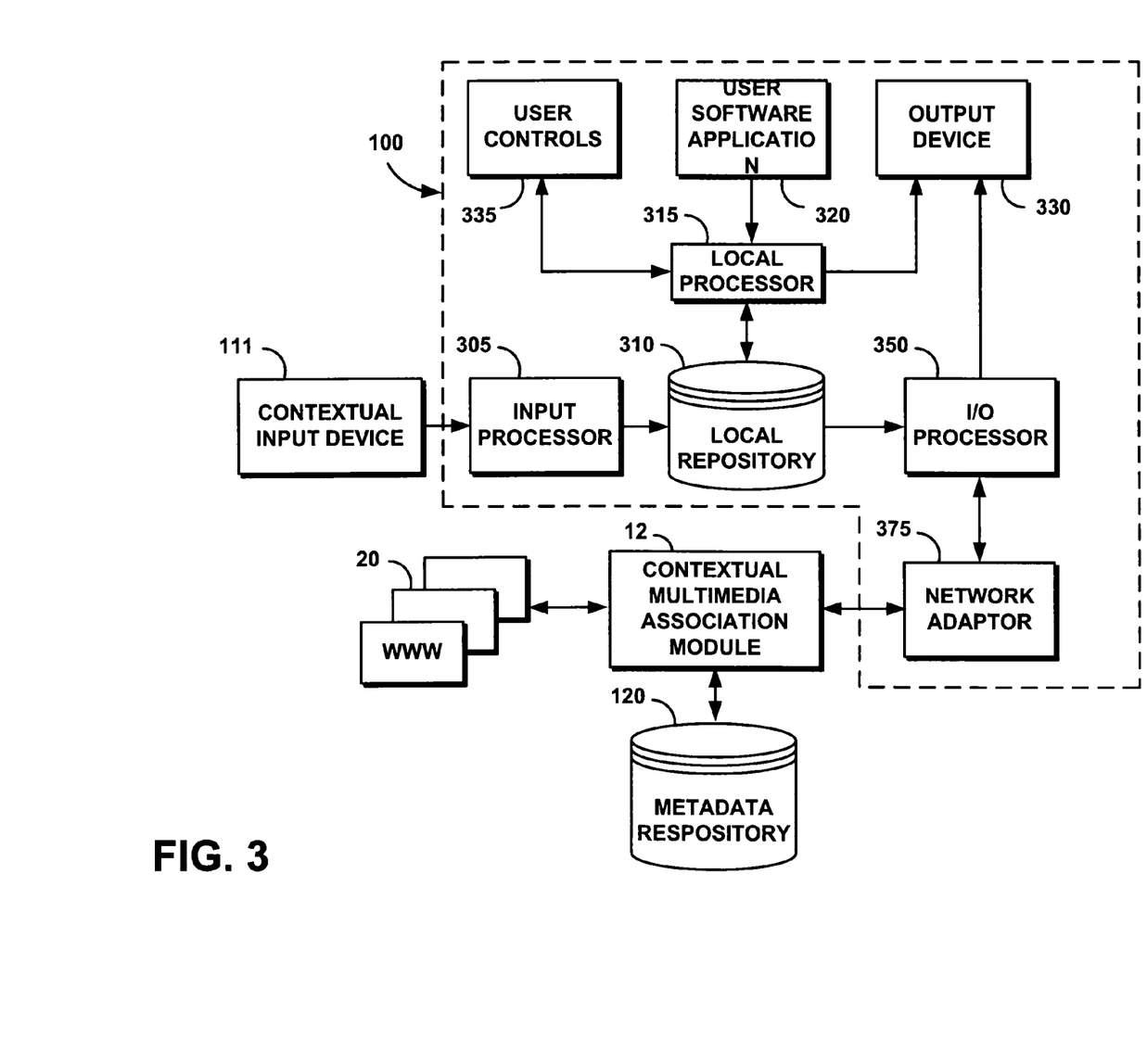
FIG. 3 is a block diagram illustrating a personal assistant device that forms part of the system of FIG. 2.

FIG. 3 illustrates an exemplary embodiment of the personal assistant device 100 according to the present invention. The personal assistant device 100 generally includes an input processor 305 that receives signals from one or more interface devices, such as the contextual input device 111. The input processor 305 performs local processing of the signal received from the contextual input device 111.

For example, if the signals were (or include) audio signals acquired, for example from an audio contextual input device such as a microphone or stethoscope 192 or a telephone 199 (FIG. 1), the input processor 305 digitizes these audio signals and optionally improves their quality. For instance, in one embodiment, the input processor 305 is capable of cropping the audio signals.

As another example, if the signals were (or include) video (or image) signals acquired, for example from a video contextual input device such as a night vision goggle, a camera, or a video camera 185, a scanner, a fax machine, a signature capture device, a fingerprint ultrasonic transducer, or an imaging device (i.e., an X-Ray machine) 190 (FIG. 1), the input processor 305 enhances the image quality, such as the image brightness and contrast, digitizes analogue signals, and/or decompresses compressed signals. Optionally, the input processor 305 is capable of modifying the data, such as cropping the video signals.

As a further example, if the signals were (or include) data signals acquired, for example from a computer 37 or a contextual input device 111 such as a bar code/card reader 187, a keypad or a diagnostic tool 188, or any other suitable sensor such as a mass spectrometer, electrocardiograph, a temperature sensor, a mass spectrometer, a chemical sensor, GPS, and so forth, as it will be described in greater detail in connection with FIG. 11, the input processor 305 digitizes the analogue data signals and transfers the same to a local repository 310.

A local processor 315 compares the acquired data signals to indexed information previously stored in the local repository 310, and processes the resulting comparison analysis based on the desired user-defined applications 320. The local processor 315 then outputs or displays the preliminary results to the user by means of an appropriate output device 330, such as a liquid crystal display (LCD), an audio message, a speaker, a monitor, or any other suitable user interface device. Controls 335 enable the user to revise the query or to modify previously inputted information.

If desired, the user enters the desired information using the controls 335, which information is processed by the local processor 315 as instructed by the user software application 320. Thereafter, the local processor 315 feeds the processed information to the local repository 310 where the information can be indexed and stored for later use and for developing digital personal profiles for the users.

An I/O processor 350, also controlled by the user software application 320, processes the information inputted by the local processor 315 into the local repository 310. For example, the I/O processor 350 combines this information with a history, a user profile created by or about the user, or inputs from the user, and automatically forms a query therefrom.

The following scenario is presented for illustration purposes: a user wishes to purchase a blue leather couch with yellow stripes on the arms. The user acquires an image of the couch and the stripes by means of the camera 185, the contextual input device 111, or any other appropriate device. The image is inputted to the contextual multimedia association module 12 either directly or via the personal assistant device 100. The contextual multimedia association module 12 recognizes the couch brand and color and the stripes pattern, and calculates the relative dimensions of the couch and the stripes. The contextual multimedia association module 12 can also utilize a previously developed or stored digital profile of the user, or inputs from the user, to automatically formulate the query. For example, the user's personal profile can specify the user's preference for a particular brand or style that matches the rest of the user's furniture, a list of the preferred manufacturers, the retailers' preferred geographical locations, or a price range. The user's inputs can include for example, manipulations of the user interface, and additional verbal instructions from the user.

The I/O processor 350 then transmits the query and/or information to the contextual multimedia association module 12 through a network adapter 375. The network adaptor 375 can be any suitable adaptor such as a Universal Serial Business (USB) port, a parallel port, an infrared (IR) port, Blue Tooth local area wireless networking protocol, 802.11 wireless Ethernet protocol, Ethernet networking protocol, and so forth.

Figure 4:
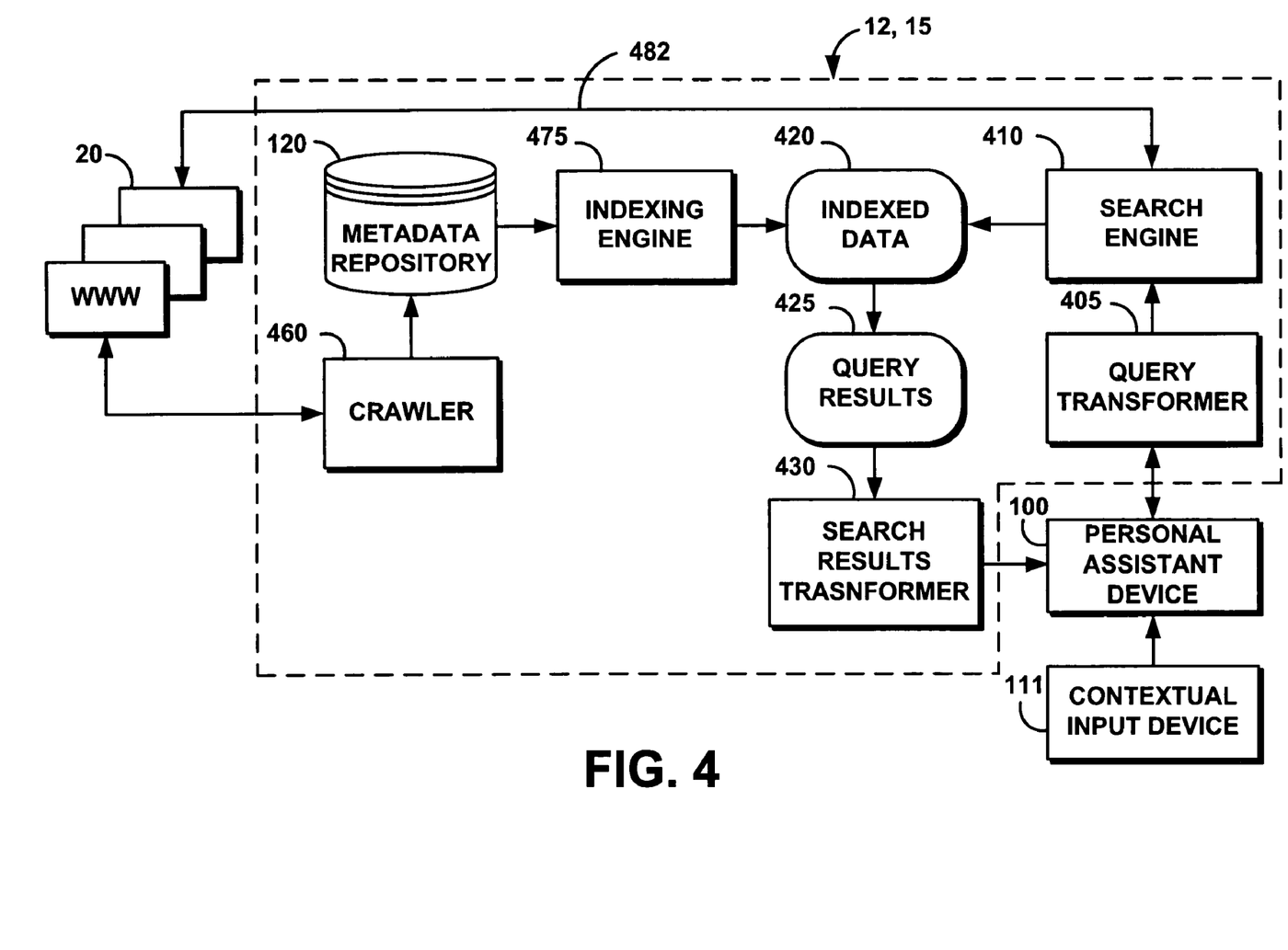
FIG. 4 is a block diagram illustrating a contextual multimedia association module that forms part of the system of FIG. 2.
Figure 5:
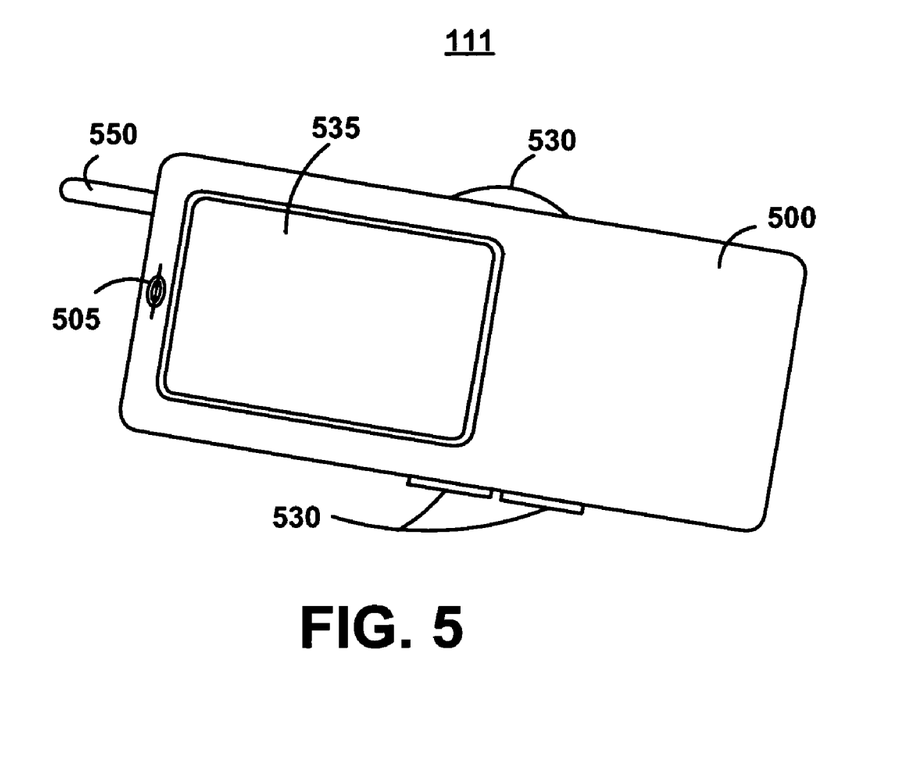
FIG. 5 is a top plan view of an exemplary embodiment of a contextual input device that forms part of the system of FIG. 2.
Figure 6:
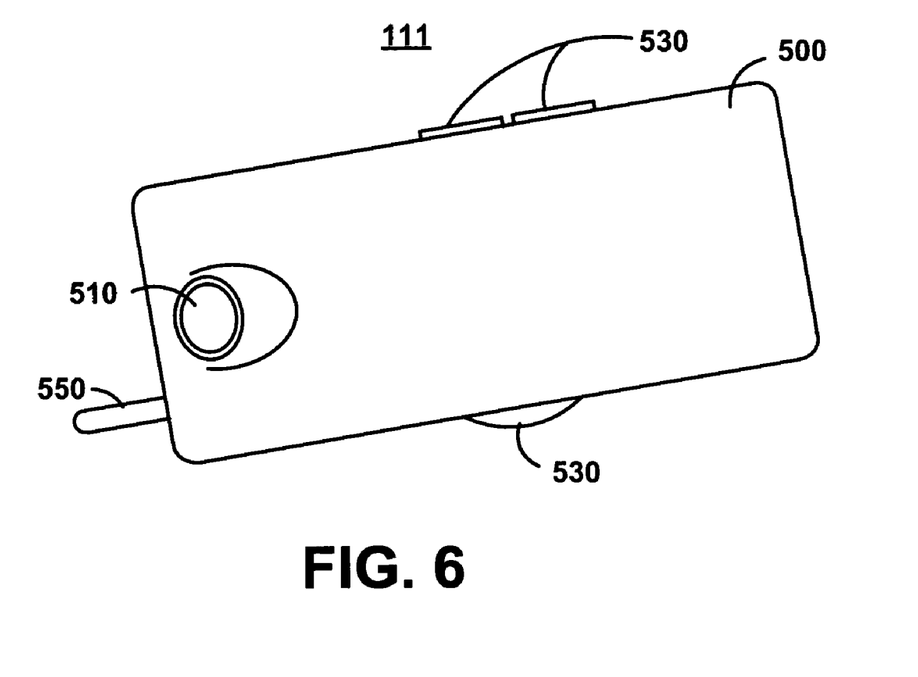
FIG. 6 is a bottom plan view of the contextual input device of FIG. 5.

Referring now to FIG. 4, it illustrates the contextual multimedia association module 12 and the metadata repository 120 that forms part of the server 15. As stated earlier, the user's query is fed to the contextual multimedia association module 12, where a query transformer 405, converts the user's query to an internal query request.

A specialized search engine 410 applies this internal query request to indexed data 420, and generates a preliminary search result with matches (i.e., query results) 425 that are specific to the user's query. In one embodiment, the specialized search engine 410 uses IBM's Query By Image Content (QBIC®) in order to retrieve the query results in the form of images. The URL for IBM's QBIC® is http://wwwqbic.almaden.ibm.com. Reference is also made to U.S. Pat. No. 5,751,286 to Barber et al. titled "Image query system and method", and U.S. Pat. No. 5,579,471 to Barber et al. titled "Image query system and method," both patents being commonly assigned to the same assignee as the present invention, and incorporated herein by reference.

Once the query results 425 are generated, they are transformed into viewable or browsable form (i.e., HTML) by a search results transformer 430. The transformed search results 425 are presented to the user's output device 330 (FIG. 3) of the personal assistant device 100, through the network adaptor 375 and optionally through the I/O processor 350 (FIG. 3).

The indexed data 420 is accumulated from the network by way of a crawler 460. The crawler 460 crawls the network 20 and downloads web documents to the metadata repository 120 where they are stored and updated systematically. The web documents are then indexed by an indexing engine 475 to generate the indexed data 420 for later use by the search engine 420. The indexed data 420 can be stored in the metadata repository 120, or in a separate data store as appropriate.

FIGS. 5 through 10 illustrate an exemplary embodiment of the contextual input device 111. While the contextual input device 111 and the personal assistant device 100 are illustrated and described herein as being two separate components for purposes of clarity, it should be clear that persons skilled in the field could integrate these two components either completely or partially. As explained earlier, the contextual input device 111 is an input device capable of acquiring and data from analogue sources or real objects, and information from conditions and manifestations.

In this exemplary embodiment, the contextual input device 111 includes a handheld apparatus which is generally comprised of a housing 500 that houses circuitry 502 (illustrated as a block diagram in FIG. 7) and that allows the user to acquire or to sense the desired data, parameters or conditions (hereinafter collectively referred to as "input data"). To this effect, the contextual input device 111 (FIG. 7) includes one or more sensors, such as an audio sensor 505, a video or image sensor 510 and/or a data sensor 515. If more than one sensor type is used, the various input data can be multiplexed by means of a multiplexer 517.

Figure 7:
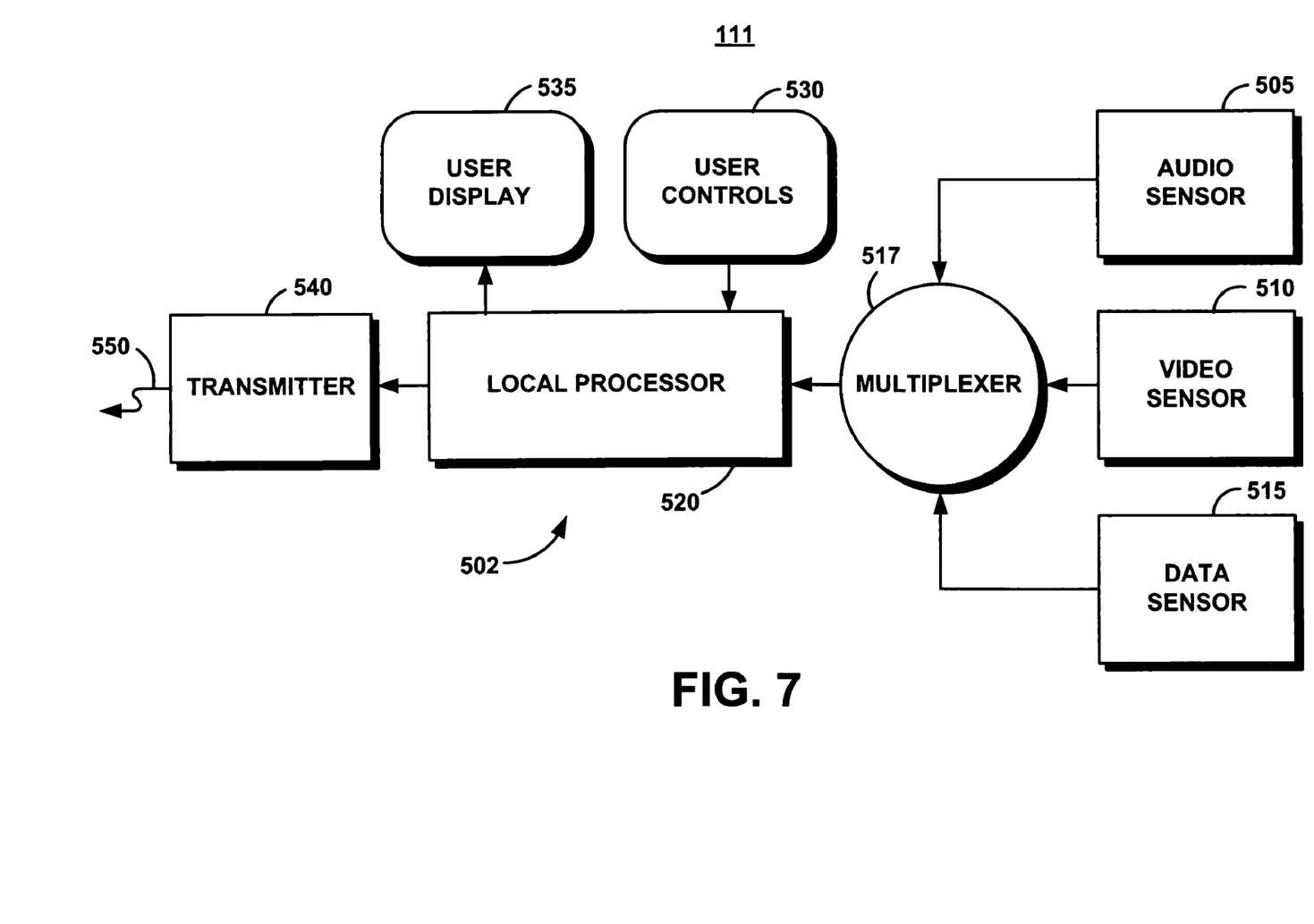
FIG. 7 is a high level block diagram of the contextual input device of FIG. 5.

The input data, whether acquired from a single or multiple sensors are sent to a local processor 520 where it is processed, as instructed by the user controls 530. The contextual input device 111 also includes a user display 535 that provides feedback to the user to enable the user to make the desired selections using the controls 530.

Once the input data is processed locally by the local processor 520, it is transmitted to the personal assistant device 100 or directly to the network 20, as desired, by means of a transmitter 540, over a communications link 550. While the communications link 550 is typified herein (FIGS. 5, 6, 8, 9, 10) by an antenna to provide wireless communication, it should be clear that the contextual input device 111 can be connected to the personal assistant device 100 by means of a cable, or any other adequate non-wireless link.

Figure 8:
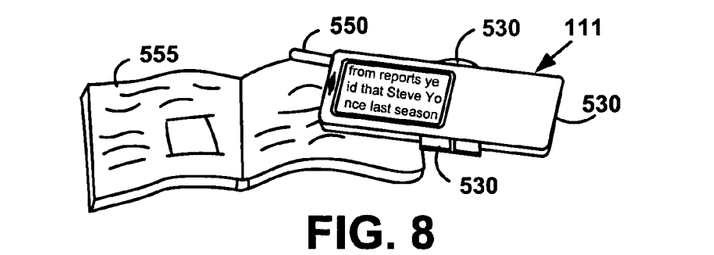
FIG. 8 is a schematic diagram of the contextual input device of FIG. 5, shown capturing and processing an image from a book, to illustrate an image magnification and stabilization feature implemented by the system of FIG. 2.

Illustrative applications for the use of the contextual input device 111 are depicted in FIGS. 8, 9 and 10. FIG. 8 shows the contextual input device 111 in the process of capturing and processing an image from a book 555, to perform image magnification and stabilization. To this end, the contextual input device 111 includes a video or image sensor 510, such as a camera, that captures the desired image.

FIG. 9 is a schematic diagram of the contextual input device 111, shown acquiring and processing data from an object, such as a pen 560. To this end, the contextual input device 111 can use either the video sensor 510 (FIG. 6) and/or a data scanner, such as the barcode reader 187. This will enable the contextual input device 111 to capture input data that assists in identifying several characteristics of the pen 560. For example, in order to formulate the query, the contextual input device 111 can capture an image of the pen 560 to identify the object as a pen and to recognize its brand name (e.g. SLICK), its barcode, model number, manufacturer, and color. After the system 10 has completed the search as explained herein, the contextual input device 111 displays the search result, i.e., "Slick pen, Select Qty: _____, Press to Order, etc." to the user. The user can scroll through the search result using the controls 530. In addition, the user can enter a selection in a designated field, such as the quantity field "Qty: _____" for example "12", and then press a key to confirm and/or execute the order.

Once the desired input data is captured, it is processed by the local processor 520 (FIG. 7) and forwarded to the personal assistant device 100. For example, the user wishes to purchase a similar pen brand of the same color. The contextual input device 111 processes the input data and derives a corresponding image descriptive of the desired pen characteristics. The input image data is processed by the system 10 to perform an image matching search on the Internet, using an image content matching technique such as the technique used in IBM's Query By Image Content service.

Based on the search result, the system 10 automatically connects to relevant web sites that provide pens or similar articles and provides the most likely sites that sell pens possessing the desired characteristics. The information in these sites can be indexed by the system 10, and the information presented to the user in a useful format, such as in a summarized, tabulated form.

With reference to FIG. 10, the contextual input device 111 is shown acquiring audio signals from an audio search such as a bird, to illustrate an audio search capability of the system 10. To this end, the contextual input device 111 uses a directed microphone as the audio sensor 505. The contextual input device 111 acquires the bird sound and processes to derive an audio profile. The audio profile can be an analogue profile which is digitized by the personal assistant device 100, or it can be digitized by the contextual input device 111. The audio profile can then be searched on the Internet to retrieve the desired information, for example the bird specie.

FIG. 11 illustrates a method of use or operation 600 of the system 10. The user initiates the operation 600 by sensing or acquiring input data at step 605, by means of the contextual input device 111, as described earlier in connection with FIGS. 5 through 10.

The input data is transmitted to the personal assistant device 100 where it is processed by the input processor 305 and the local processor 315 as described above in connection with FIG. 3. For instance, the image input data of the pen 560 acquired by the contextual input device 111 (FIG. 9) is digitized by the input processor 305 (FIG. 3). The user software application 320 (FIG. 3) is applied to the input data, and instructs the local processor 315 (FIG. 3) to compare the input data to cached information, such as previous search (or service) results previously stored in the local repository 310 (FIG. 3). For example, the local processor 315 determines if the contextual input device 111 has acquired sufficient data to generate a searchable query to satisfy the desired user-defined application 320.

One user-defined application 320 can be to purchase a pen with similar characteristics to those acquired from the pen 560 (FIG. 9). Another user-defined application 320 can be to locate a competitive product. Yet another user-defined application 320 can be to locate the best services to market or sell pens 560. It should be clear that other user-defined applications 320 could be implemented by the personal assistant device 100.

At step 610 the local processor 315 (FIG. 3) processes the comparative analysis generated by the local processor 315, and forwards the same to the I/O processor 350 where an image query is automatically formed (step 615). The image query is then transmitted to the contextual multimedia association module 12 (FIG. 4) at step 620.

At step 625, and with reference to FIG. 4, the search engine 410 and the indexing engine 475 of the contextual multimedia association module 12 process the query. An exemplary remote processing would be to translate the query to one or more languages so that much broader data stores could be searched. Another exemplary remote processing step would be to enhance the image in anticipation for the search. For example, the image can be compressed or decompressed, as needed. Yet another exemplary remote processing step would be to index the input data with GPS location, time, and other factors. In summary, the remote processing (step 625) of the query either enhances the query and/or performs the required intensive processing steps.

In one embodiment, the search engine 410 is IBM's Query By Image Content (QBIC®) that searches the Internet to match a picture of the pen 560 to images stored in the metadata repository 120, and/or stored as indexed data 420 (step 630). Alternatively, the search engine 410 applies the query directly to the Internet 20, as illustrated by the line 482 (FIG. 4). The search engine 410 connects to the Internet services and gathers the web sites, services, products, or any other information of interest to the user.

At step 635 the contextual multimedia association module 12 receives the gathered information and undertakes the necessary post processing steps to optimize the search results (step 635). For example, the contextual multimedia association module 12 can scale the image to reduce its size, or it can convert the query results from text to speech, and so forth. This process 635 implements intensive processing steps.

The search results are then sent to the personal assistant device 100 (FIG. 3) at step 640, where the search results are processed by the I/O processor 350 (FIG. 3) to be formatted at step 645. The formatted search results are then displayed to the user at step 650.

It is to be understood that the specific embodiments that have been described herein are merely illustrative of certain applications of the principle of the present invention. Numerous modifications may be made without departing from the spirit and scope of the present invention. Moreover, while the present invention is described for illustration purpose only in relation to the WWW or the Internet, it should be clear that the invention is applicable as well to databases and other tables with indexed entries. In addition, although the various components of the system 10 are described herein as distinct elements, it should be clear that some or all of these components can be functionally and/or structurally combined.

What is claimed is:

1. A method for providing network services related to locating at least one of a good and a service by:
    acquiring contextual input data related to at least one of the good and the service via a contextual input device configured to receive data from the at least one of the good and the service;
    digitizing and processing the acquired contextual input data from the contextual input device;
    receiving contextual input data related to the at least one of the good and the service;
    determining if there is cached information related to previously stored search results;
    if there is cached information related to previously stored search results, comparing the contextual input data to the cached information;
    automatically generating a preliminary search query based on the contextual input data if there is no cached information;
    automatically generated a preliminary search query based on the contextual input data and the cached information if there is cached information;
    performing a preliminary search based on the preliminary search query;
    providing preliminary search results based on the preliminary search query;

in response to receiving a request for additional information, refining the preliminary search query to improve the preliminary search results;

receiving user provided information related to the contextual input data;

generating a search query based on the contextual input data and the user provided information;

performing a search based on the search query; and providing search results based on the contextual input data and the user provided information, the search results being related to a source of the at least one of the good and the service such that the user can locate the at least one of the good and the service.

2. The method according to claim 1, further including automatically associating contextual input data with characteristics of at least one of the good and service.

3. The method according to claim 2, wherein generating the search query includes automatically formulating the search query based on the contextual input data.

4. The method according to claim 2, wherein generating the search query includes automatically formulating the search query based on a user profile.

5. The method according to claim 2, wherein generating a search query based on the contextual input data and the user provided information includes applying the search query to a data stored on at least one of a metadata repository and a network.

6. The method according to claim 2, wherein the contextual input data are based on any one or more of image signals or audio signals; and wherein processing the contextual input data includes enhancing the quality of the anyone or more of image signals or audio signals.

7. The method according to claim 1, further including developing a digital profile for a user based on search results which were previously presented to the user.

8. The method according to claim 7, wherein developing the digital profile includes updating the user digital profile based on recent search results.

* * * * *